(12) United States Patent
He et al.

(10) Patent No.: US 9,806,663 B2
(45) Date of Patent: Oct. 31, 2017

(54) ROTARY ELECTRIC MACHINE CONTROL APPARATUS

(71) Applicant: DENSO CORPORATION, Kariya, Aichi-pref. (JP)

(72) Inventors: Xuezhi He, Kariya (JP); Masaki Nishiyama, Kariya (JP); Hirofumi Yamashita, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/235,605

(22) Filed: Aug. 12, 2016

(65) Prior Publication Data

US 2017/0141716 A1 May 18, 2017

(30) Foreign Application Priority Data

Nov. 13, 2015 (JP) ................................. 2015-223011

(51) Int. Cl.
| | |
|---|---|
| *H02P 1/04* | (2006.01) |
| *H02P 3/00* | (2006.01) |
| *H02P 7/00* | (2016.01) |
| *H02P 29/68* | (2016.01) |
| *H02P 25/03* | (2016.01) |
| *H02P 27/06* | (2006.01) |

(52) U.S. Cl.
CPC .............. *H02P 29/68* (2016.02); *H02P 25/03* (2016.02); *H02P 27/06* (2013.01)

(58) Field of Classification Search
CPC .......... H02P 29/60; H02P 29/02; H02P 29/68; H02P 27/06; H02P 29/032; H02P 29/64; H02P 29/662; H02P 6/34; H02P 21/0089; H02P 21/06; H02P 21/14; H02P 2201/09; H02P 2207/01; H02P 23/14; H02P 29/0241
USPC ........................................ 318/434, 472, 473
See application file for complete search history.

(56) References Cited

U.S. PATENT DOCUMENTS

| | | | | |
|---|---|---|---|---|
| 5,227,703 A | * | 7/1993 | Boothe ..................... | B60L 3/00 318/139 |
| 6,960,152 B2 | * | 11/2005 | Aoki ....................... | B60L 15/20 477/3 |
| 7,353,094 B2 | * | 4/2008 | Okoshi .................. | B60K 6/445 180/65.1 |
| 7,642,738 B2 | * | 1/2010 | Hamada ............... | B62D 5/0496 318/432 |
| 7,663,329 B2 | * | 2/2010 | Muta .................. | H02M 7/53875 180/65.1 |
| 8,062,170 B2 | * | 11/2011 | West .................. | G05D 23/1934 477/3 |

(Continued)

*Primary Examiner* — Paul Ip
(74) *Attorney, Agent, or Firm* — Oliff PLC (57) ABSTRACT

A motor-generator control part controls driving of a motor-generator, which is a drive power source of a vehicle. A torque limitation part of the MG control part limits a torque of the motor-generator when an element temperature indicating a system temperature increases to be higher than a limitation starting temperature. The torque limitation part continues the torque limitation, which was performed when the element temperature was at a peak temperature, until a limitation continuation period elapses, when the element temperature changes from increasing to decreasing as a result of limiting the torque of the motor-generator. Thus torque variation is suppressed while also suppressing overheating of a motor-generator driving system.

8 Claims, 6 Drawing Sheets

(56) References Cited

U.S. PATENT DOCUMENTS

| | | | | |
|---|---|---|---|---|
| 8,089,234 B2* | 1/2012 | Takizawa | | B60L 15/00 318/139 |
| 8,096,919 B2* | 1/2012 | Takizawa | | B60L 15/20 477/16 |
| 8,354,813 B2* | 1/2013 | Hasegawa | | H02P 29/68 318/432 |
| 8,421,391 B2* | 4/2013 | Yeh | | G01K 7/42 318/400.15 |
| 8,773,058 B2* | 7/2014 | Baglino | | B60L 15/025 318/434 |
| 2004/0235613 A1* | 11/2004 | Aoki | | B60L 15/20 477/3 |
| 2004/0249518 A1* | 12/2004 | Okoshi | | B60K 6/445 701/1 |
| 2007/0290650 A1* | 12/2007 | Muta | | H02M 7/53875 318/799 |
| 2008/0048591 A1* | 2/2008 | Hamada | | B62D 5/0496 318/9 |
| 2008/0315814 A1* | 12/2008 | Takizawa | | B60L 15/00 318/434 |
| 2009/0066283 A1* | 3/2009 | Son | | H02P 29/64 318/473 |
| 2009/0088294 A1* | 4/2009 | West | | G05D 23/1934 318/472 |
| 2009/0120701 A1* | 5/2009 | Taguchi | | H02P 29/68 180/65.285 |
| 2009/0284202 A1* | 11/2009 | Miura | | G01K 7/42 318/473 |
| 2009/0288634 A1* | 11/2009 | Takizawa | | B60L 15/20 123/349 |
| 2010/0235031 A1* | 9/2010 | Yoshida | | B60L 11/1885 701/22 |
| 2010/0320951 A1* | 12/2010 | Hasegawa | | H02P 29/68 318/434 |
| 2011/0279074 A1* | 11/2011 | Yeh | | G01K 7/42 318/432 |
| 2012/0007532 A1* | 1/2012 | Baglino | | B60L 15/025 318/473 |
| 2012/0101675 A1* | 4/2012 | Saito | | B60L 15/20 701/22 |
| 2012/0133314 A1* | 5/2012 | Kozarekar | | B60L 1/003 318/473 |
| 2013/0147407 A1* | 6/2013 | Kawamura | | H03K 17/0828 318/400.21 |
| 2015/0112531 A1* | 4/2015 | Nakajima | | B60L 11/1803 701/22 |
| 2015/0115531 A1* | 4/2015 | Ali | | A63B 63/00 273/398 |

* cited by examiner

FIG. 1

FRONT ← → REAR

ROTARY ELECTRIC MACHINE CONTROL APPARATUS

CROSS REFERENCE TO RELATED APPLICATION

This application is based on Japanese patent application No. 2015-223011 filed on Nov. 13, 2015, the whole contents of which are incorporated herein by reference.

FIELD

The present disclosure relates to a rotary electric machine control apparatus.

BACKGROUND

U.S. Pat. No. 8,062,170 discloses one exemplary motor control apparatus, which controls driving of a motor. In this motor control apparatus, for example, a maximum torque is attenuated in accordance with temperature before an electronic driving system for driving a motor reaches a critical temperature.

When torque of the motor is limited in accordance with temperature, sensitivity of torque relative to a temperature change increases. For this reason, when the maximum torque is changed in accordance with temperature even under a low temperature condition, the torque of the motor is likely to vary in accordance with temperature in high load operation time.

SUMMARY

It is therefore an object to provide a rotary electric machine control apparatus, which is capable of reducing a torque variation while protecting a rotary electric machine driving system from overheating.

According to one aspect, a rotary electric machine control apparatus controls driving of a rotary electric machine, which is a drive power source of a vehicle. The rotary electric machine control apparatus comprises a temperature calculation part and a torque limitation part. The temperature calculation part calculates a system temperature of a rotary electric machine driving system, which includes the rotary electric machine and a driving circuit part including an inverter part for switching over current supply to the rotary electric machine. The torque limitation part limits a torque of the rotary electric machine, when the system temperature increases to be higher than a limitation starting temperature. The torque limitation part continues a torque limitation performed at a peak temperature of the system temperature until a limitation continuation period elapses, the peak temperature indicating a change of the system temperature from increasing to decreasing as a result of limiting the torque of the rotary electric machine.

DETAILED DESCRIPTION OF THE EMBODIMENT

A rotary electric machine control apparatus will be described below with reference to one embodiment shown in the accompanying drawings.

(Embodiment)

Figure 1:
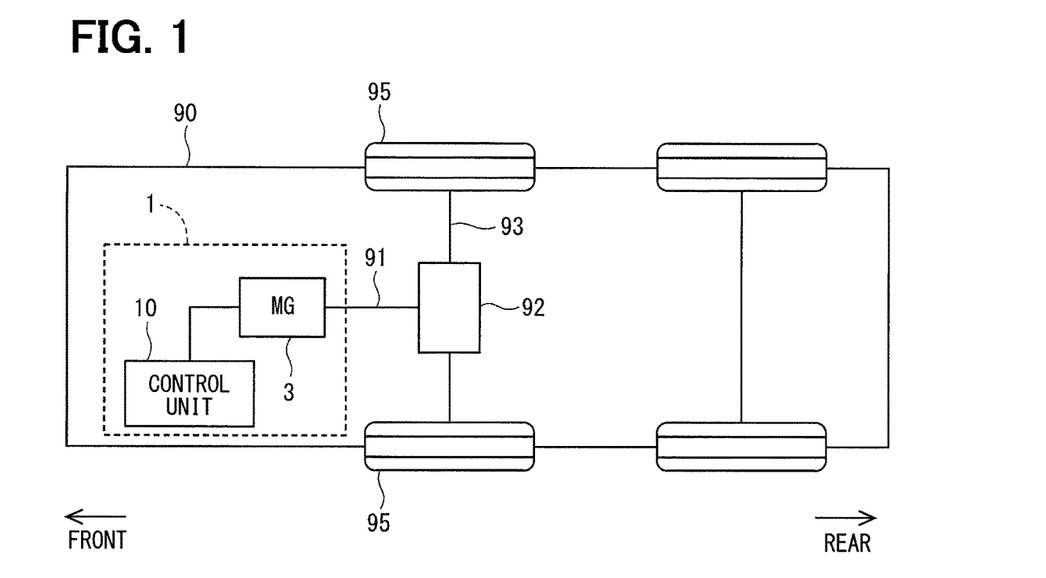
FIG. 1 is a schematic illustration of a vehicle, which has a motor-generator driving system in one embodiment.
Figure 2:
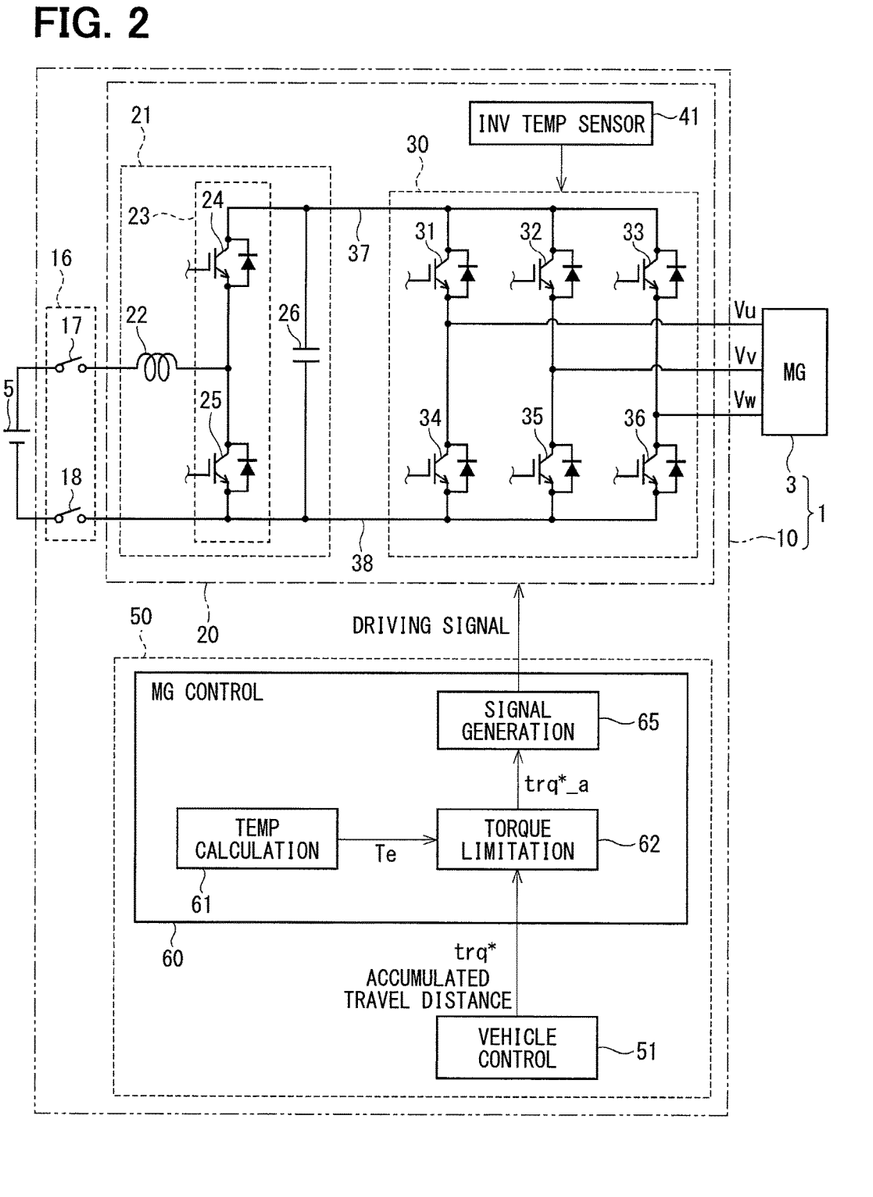
FIG. 2 is a block diagram showing the motor-generator driving system in the embodiment.

A rotary electric machine control apparatus according to one embodiment of is shown in FIG. 1 to FIG. 7. As shown in FIG. 1 and FIG. 2, a motor-generator driving system 1 is mounted in a vehicle 90 as a rotary electric machine driving system. The vehicle 90 is an EV vehicle, which travels with a driving force of a motor-generator 3 provided as a rotary electric machine. The MG 3 is simply referred to as MG 3 below. The vehicle 90 is a front-wheel drive vehicle, which is provided with the MG driving system 1 at its front part to drive front wheels 95.

The MG driving system 1 includes the MG 3, a control unit 10 and the like. The MG 3 has a function of a motor, which is driven with electric power supply from a battery 5 shown in FIG. 2 to generate torque, and a function of a generator, which is driven at braking time of the vehicle 90 to generate electric power. The MG 3 is a three-phase AC rotary electric machine of a permanent magnet type. The MG 3 is referred mostly as a motor in the following description.

Driving force of the MG 3 is transferred to a drive axle 91. The driving force transferred to the drive axle 91 drives the front wheels 95, which are driving wheels, to rotate through a differential gear 92 and a wheel axle 93. Although not shown in FIG. 1, a transmission may be provided between the MG 3 and the differential gear 92. The transmission may be a continuously variable type (CVT) or a multistage type.

As shown in FIG. 2, the battery 5 is a DC power source such as a secondary battery, for example, a nickel-metal hydride battery or a lithium-ion battery, which is capable of charging and discharging. In place of the battery 5, a storage device such as an electric double-layer capacitor battery may be used as the DC power source. The battery 5 is so controlled that its state of charge (SOC) is maintained in a predetermined range.

The control unit 10 is provided to control driving of the MG 3 and includes a driving circuit part 20, a control part 50 and the like. A part of control signal lines are not shown for simplicity. The driving circuit part 20 is connected to the battery 5 through a relay unit 16. The relay unit 16 includes a high potential side relay 17 and a low potential side relay 18. The high potential side relay 17 and the low potential side relay 18 may be mechanical relays or semiconductor relays. By turning on the relay unit 16, the battery 5 and the driving circuit part 20 are electrically connected to each other. By turning off the relay unit 16, the battery 5 and the driving circuit part 20 are disconnected from each other.

The driving circuit part 20 includes a boost converter 21 and an inverter 30. The boost converter 21 includes a reactor 22, a boost driving part 23, a capacitor 26 and the like. The reactor 22 generates an induced voltage in response to a change in reactor current and stores electric energy. The boost driving part 23 includes a high potential side switching element 24 and a low potential side switching element 25.

The switching element is referred simply as a SW element in the following description. The high potential side SW element 24 and the low potential side SW element 25 are both insulated-gate bipolar transistors (IGBTs). An output terminal of the reactor 22 is connected to a node between the high potential side SW element 24 and the low potential side SW element 25.

The SW elements 24 and 25 turn on and off alternately and complementarily in response to converter driving signals applied from the control circuit part 50. When the high potential side SW element 24 is in an off-state and the low potential side SW element 25 is in an on-state, the reactor current flows in the reactor 22 and the reactor 22 stores electric energy. When the high potential side SW element 24 is in an on-state and the low potential side SW element 25 is in an off-state, the energy stored in the reactor 25 is discharged. The capacitor 26 is thus charged to provide a boosted voltage, which is outputted by superimposing the induced voltage on the inputted voltage from the battery 5. The capacitor 26 is connected in parallel with the inverter 30.

The inverter 30 is a three-phase inverter, which includes six SW elements 31 to 36. The SW elements 31 to 36 are all IGBTs and provided to be able to radiate heat from both surfaces. The inverter 30 is cooled by an inverter cooler (not shown), in which cooling water circulates. Collectors of the SW switches 31 to 33 provided at a high potential side are connected to the high potential line 37. Emitters of the SW switches 31 to 33 are connected to collectors of the low potential side SW elements 34 to 36 provided at the low potential sides and paired with the SW elements 31 to 33, respectively. The emitters of the SW elements 34 to 36 connected at the low potential side are connected to a low potential line 38. Nodes between the high potential side SW elements 31 to 33 and the low potential side SW elements 34 to 36, which are paired, respectively, are connected to one ends of phase coils of the MG 3.

The high potential side SW elements 31 to 33 and the low potential side SW elements 34 to 36, which are paired, respectively, turn on and off alternately and complementarily in response to the inverter driving signals applied from the control circuit part 50. With a DC power of the output voltage boosted by the boost converter 21 and the SW elements 31 to 36 turning on and off, the inverter 30 converts the DC power to a three-phase AC power and outputs the AC power to the MG 3.

An inverter temperature sensor 41 detects a temperature of the SW elements 31 to 36. The inverter temperature sensor 41 is shown as one functional block in FIG. 2 for simplicity. It is actually temperature-sensitive diodes, which are housed in the SW elements 31 to 36, respectively. Each detection value of the inverter temperature sensor 41 is outputted to the control circuit part 50.

The control circuit part 50 includes a vehicle control part 51 and a MG control part 60, which is provided as a rotary electric machine control apparatus. The vehicle control part 51 and the MG control part 60 are formed of primarily a microcomputer. Each processing of the vehicle control part 51 and the MG control part 60 may be software processing performed by executing programs stored in a memory such as a ROM by a CPU or hardware processing performed by specific electronic circuits. The vehicle control part 51 and the MG control part 60 are capable of communicating information via a controller area network (CAN).

The vehicle control part 51 acquires output signals of an accelerator sensor, a shift switch, a brake switch, a vehicle speed sensor and the like, which are not shown, and controls an entire operation of the vehicle 90 based on the acquired output signals. The vehicle control part 51 calculates a torque command value trq* for driving the MG 3 based on the vehicle speed V and the like. The torque command value trq* is outputted to the MG control part 60. The vehicle control part 51 transmits information such as an accumulated travel distance of the vehicle 90 to the MG control part 60.

The MG control part 60 includes, as functional blocks, a temperature calculation part 61, a torque limitation part 62, a signal generation part 65 and the like. The temperature control part 61 calculates an element temperature Te based on the detection value of the inverter temperature sensor 41. The element temperature Te is calculated as an average value of temperatures of six SW elements 31 to 36. The element temperature Te is calculated as a system temperature.

The torque limitation part 62 limits the torque command value trq* based on the element temperature Te and calculates a limited torque command value trq*_a. The limited torque command value trq*_a is calculated by multiplying the torque command value trq* by a torque limitation coefficient k. The torque limitation coefficient k is set as $0 \leq k \leq 1$. By setting the torque limitation coefficient k to be smaller than 1 (that is, k<1), the torque of the MG 3 is limited. When the torque limitation coefficient k is 1, the limited torque command value trq*_a equals the torque command value trq* supplied from the vehicle control part 51 and hence the torque of the MG 3 is not limited.

When the torque of the MG 3 is limited, the torque limitation part 62 outputs information indicative of the torque limitation to a notification part such as an instrument panel or a navigation device. It is thus possible to notify a driver of the torque limitation by way of activating a warning light, a warning display or a warning sound generator.

The signal generation part 65 generates the inverter driving signals for controlling on-off operations of the SW elements 31 to 36 to the driving circuit part 20. The inverter driving signals are generated based on the limited torque command value trq*_a, a rotation angle θ of the MG 3 acquired from a rotation angle sensor (not shown). The signal generation part 65 generates the converter driving signals for controlling the on-off operations of the SW elements 24 and 25 and outputs the converter driving signals to the driving circuit part 20.

Torque limitation for the MG 3 will be described below. When the element temperature Te increases to be higher than a limitation starting temperature Ta, the torque limitation part 62 limits the torque of the MG 3. Specifically, as shown by a solid line in FIG. 3, when the element temperature Te is equal to or lower than the limitation starting temperature Ta, the torque limitation coefficient k is set to 1 and the torque limitation is not performed. When the element temperature Te is higher than the limitation starting temperature Ta and the element temperature Te increases, the torque limitation coefficient k is decreased in accordance with the element temperature Te to decrease the torque command value. Thus the MG driving system 1 is protected from overheating.

Figure 3:
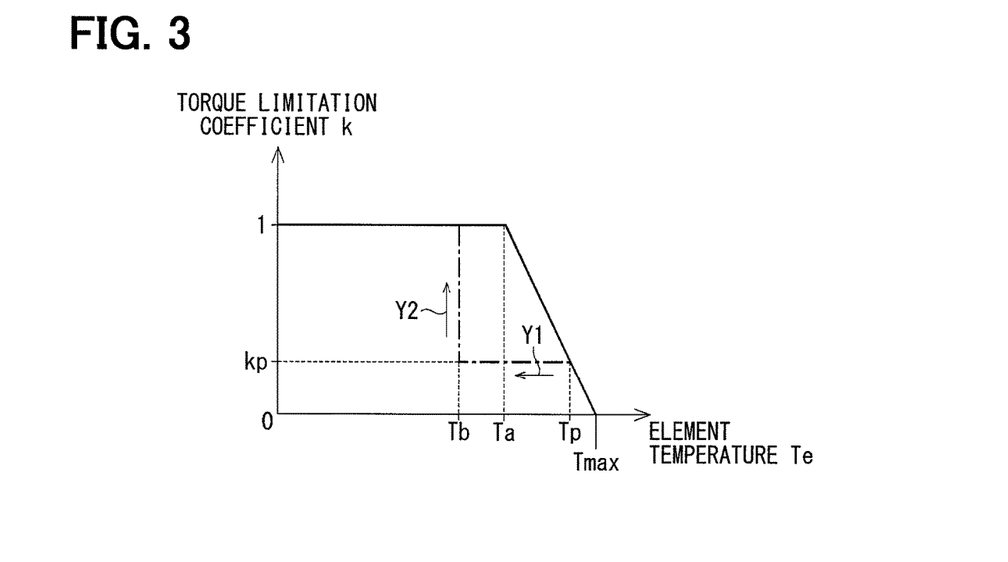
FIG. 3 is a graph showing a torque limitation coefficient in the embodiment.

When the element temperature Te decreases by limitation of the torque of the MG 3, a temperature change is likely to occur. For example, when the torque limitation coefficient k is changed in accordance with the element temperature Te in the same manner as in a case of an increase of the element temperature Te as long as the element temperature Te remains to be higher than the limitation starting temperature Ta, the element temperature Te increases again with an increase of the torque limitation coefficient k, that is, with a decrease in the torque limitation. When the torque limitation coefficient k varies in accordance with a variation in the element temperature Te, the torque of the MG 3 varies, thus degrading drivability.

Therefore, when the element temperature Te changes to decrease from increase at a temperature, which is referred to as a peak temperature Tp, a peak-time limitation coefficient kp at the peak temperature Tp is maintained as indicated by a one-dot chain line in FIG. 3 (refer to arrow Y1). When the element temperature Te decreases to be equal to or lower than the limitation ending temperature Tb, the toque limitation is stopped. The torque limitation coefficient k is changed gradually from the peak-time limitation coefficient kp to 1 thereby to prevent the torque from changing rapidly (refer to arrow Y2).

Figure 4:
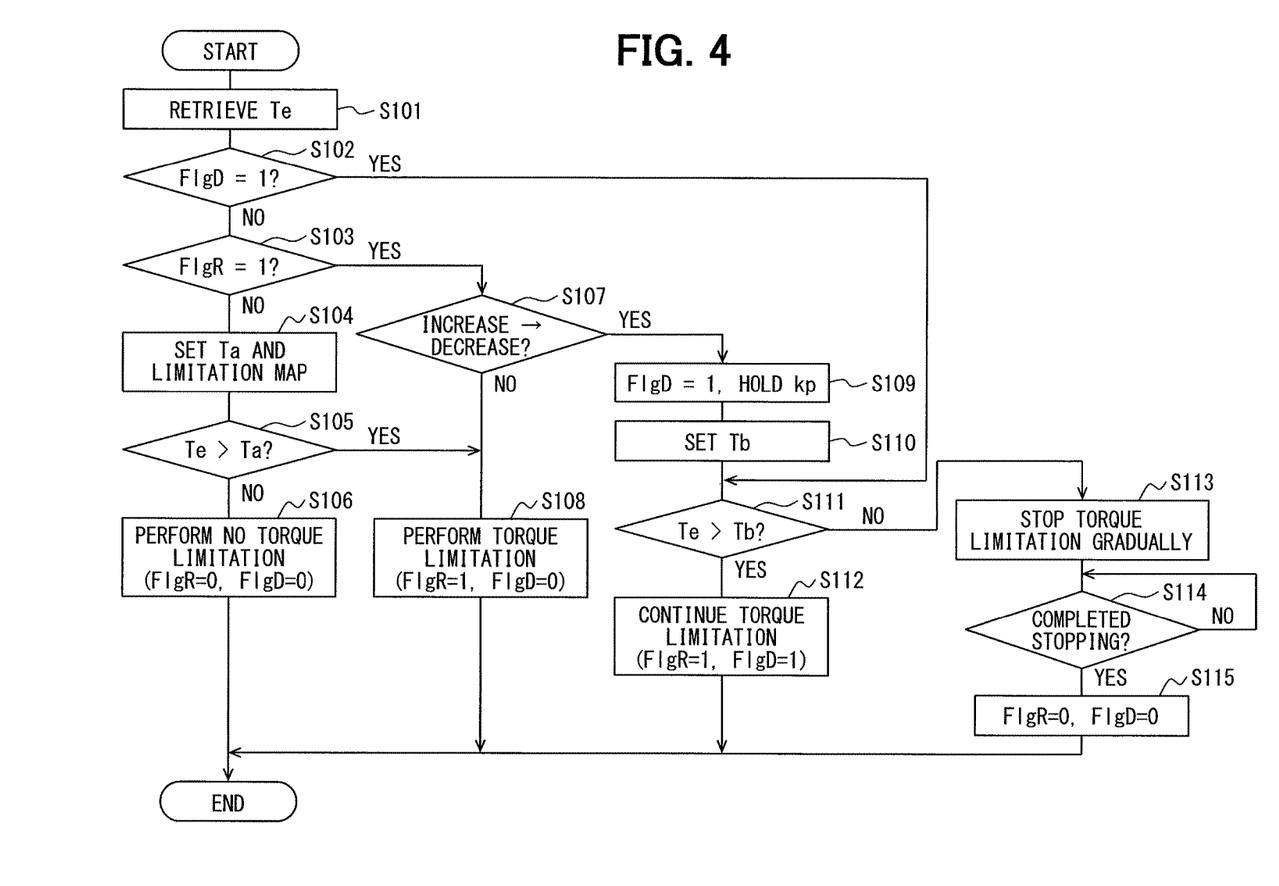
FIG. 4 is a flowchart showing torque limitation processing in the embodiment.

The torque limitation processing in the present embodiment will be described with reference to a flowchart shown in FIG. 4. In the following description, each step is simplified as S. This processing is executed by the torque limitation part 62 at a predetermined interval. At S101, the torque limitation part 62 retrieves the element temperature Te from the temperature control part 61.

At S102, the torque limitation part 62 checks whether a decrease check flag FlgD described below is set. In the figure, "1" indicates that each flag is in a set-state and "0" indicates that each flag is not in the set-state. When the decrease check flag FlgD is in the set-state (S102: YES), the processing is shifted to S111. When the decrease check flag FlgD is not in the set-state (S102: NO), the processing is shifted to S103.

At S103, the torque limitation part 62 checks whether a torque limitation flag FlgR described later is set. When the torque limitation flag FlgR is in the set-state (S103: YES), the processing is shifted to S107. When the torque limitation flag FlgR is not in the set-state (S103: NO), the processing is shifted to S104.

At S104, the torque limitation part 62 sets the limitation starting temperature Ta in accordance with a driving state of the MG 3, a cooling ability of the MG driving system 1 and a degradation state of the MG driving system 1. An MG load is used as the driving state of the MG 3, a cooling water volume indicating a flow speed of the cooling water in the inverter cooler is used as the cooling ability of the MG driving system 1, and an accumulated travel distance of the vehicle 90 is used as the degradation state of the MG driving system 1.

Figure 5A:
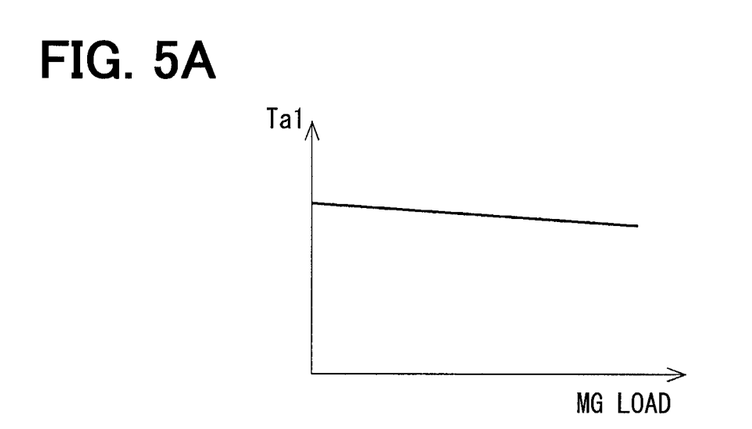
FIG. 5A to FIG. 5C are graphs showing limitation starting temperatures in the embodiment.
Figure 5B:
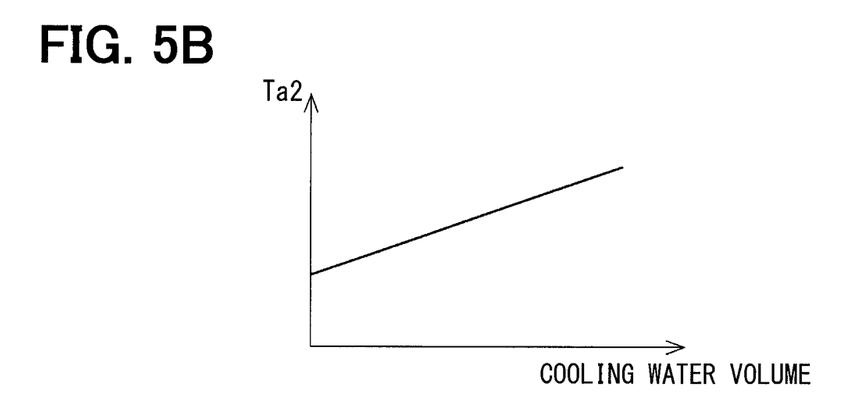
Figure 5C:
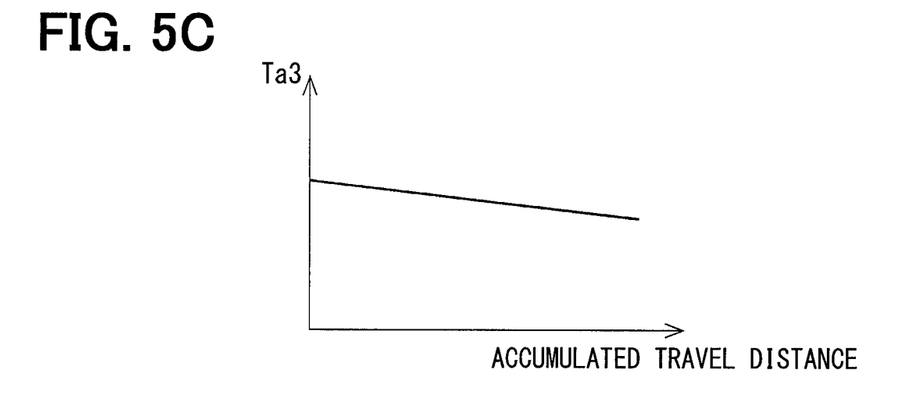

The MG control part 60 has maps, which are data tables, as shown in FIG. 5A, FIG. 5B and FIG. 5C, which represent provisional values Ta1, Ta2 and Ta3 relative to the MG load, the cooling water volume and the accumulated travel distance, respectively. As shown in FIG. 5A, the provisional value Ta1 is set to decrease as the MG load increases. As shown in FIG. 5B, the provisional value Ta2 is set to increase as the cooling water volume increases. As shown in FIG. 5C, the provisional value Ta3 is set to decrease as the accumulated travel distance increases. FIG. 5A, FIG. 5B and FIG. 5C show linear patterns of the provisional values Ta1, Ta2 and Ta3 relative to the MG load, the cooling water volume and the accumulated travel distance. However, the patterns of the provisional values Ta1, Ta2 and Ta3 relative to the respective parameters may be set in different patterns such as non-linear patterns. The limitation ending temperature Tb may also be set differently. A minimum value, that is, the smallest value, of the provisional values Ta1, Ta2 and Ta3 are set to the limitation starting temperature Ta.

The torque limitation part 62 sets a torque limitation map in accordance with the set limitation starting temperature Ta. The limitation starting temperature Ta is variable and an upper limit temperature Tmax of the element temperature Te is fixed. For this reason, the torque limitation map is set in accordance with the set limitation starting temperature Ta by varying a limitation inclination related to the torque limitation coefficient k. That is, the inclination indicated by solid lines in FIG. 5A, FIG. 5B and FIG. 5C are varied in accordance with the set limitation starting temperature Ta.

Referring to FIG. 4 again, at S105 executed following S104, the torque limitation part 62 checks whether the element temperature Te is higher than the limitation starting temperature Ta. When the element temperature Te is higher than the limitation starting temperature Ta (S105: YES), the torque limitation flag FlgR is set and the processing is shifted to S108. When the element temperature Te is equal to or lower than the limitation starting temperature Ta (S105: NO), the processing is shifted to S106.

At S106, the torque limitation part 62 sets the torque limitation coefficient k to 1 and calculates the limited torque command value trq*_a without torque limitation. The limited torque command value trq*_a calculated at this step equals the torque command value trq*. S106 is executed when both of the torque limitation flag flgR and the decrease check flag FlgD are not in the set-states (that is, FlgR=0 and FlgD=0).

At S107 executed when the decrease check flag FlgD is not in the set-state (S102: NO) and the torque limitation flag FlgR is in the set-state (S103: YES), the torque limitation part 62 checks whether the element temperature Te changed from increasing to decreasing. The temperature decrease may be checked in any ways. For example, a previous value and a present value of the element temperature Te are compared and the element temperature Te is determined to have changed from increasing to decreasing when the present value is smaller than the previous value. Alternatively, the temperature decrease may be checked by calculating a moving average of each predetermined period and comparing a previous value and a present value of the moving average. When the element temperature Te changes from increasing to decreasing (S107: YES), the processing is shifted to S109. When the element temperature Te does not change from increasing to decreasing (S107: NO), that is, the temperature is increasing, the processing is shifted to S108.

At S108, which is executed when the element temperature Te is higher than the limitation starting temperature Ta (S105: YES) or the element temperature is increasing (S107: NO), the torque limitation part 62 performs the torque limitation in accordance with the element temperature Te. Specifically, the torque limitation part 62 calculates the torque limitation coefficient k from the map in accordance with the element temperature Te and calculates the limited torque command value trq*_a by multiplying the torque command value trq* by the torque limitation coefficient k. At this step, since the torque limitation coefficient k is smaller than 1, the limited torque command value trq*_a is smaller than the torque command value trq*. Thus the torque of the MG 3 is limited. S108 is executed, when the torque limitation flag FlgR is in the set-state and the decrease check flag FlgD is not in the set-state (that is, FlgR=1 and FlgD=0).

At S109 executed when the element temperature Te changed from increasing to decreasing (S107: NO), the torque limitation part 62 sets the decrease check flag FlgD.

The torque limitation part 62 sets the element temperature Te calculated at immediately preceding time to be the peak temperature Tp and holds the torque limitation coefficient k set based on the peak temperature Tp as the peak-time limitation coefficient kp. At S110, the torque limitation part 62 sets the limitation ending temperature Tb in accordance with the driving state of the MG 3, cooling ability of the MG driving system 1 and the degradation state of the MG driving system 1.

Figure 6A:
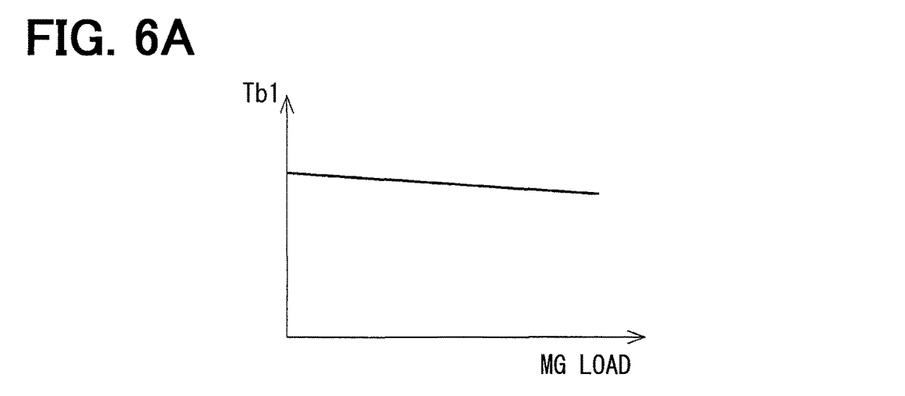
FIG. 6A to FIG. 6C are graphs showing limitation ending temperatures in the embodiment.
Figure 6B:
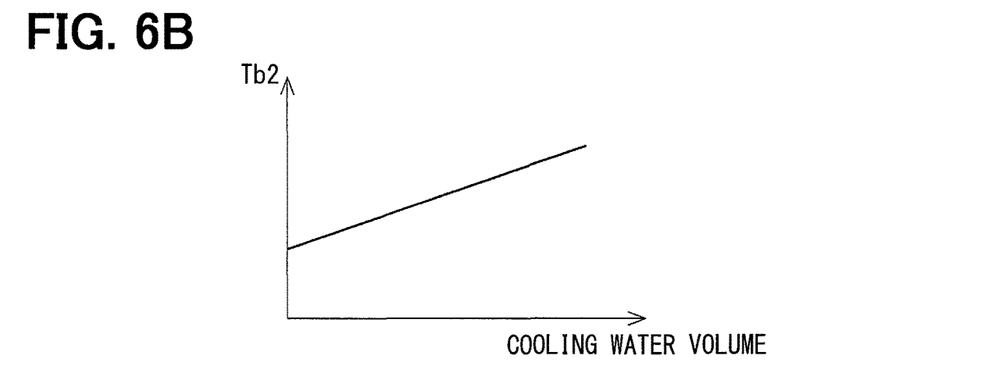
Figure 6C:
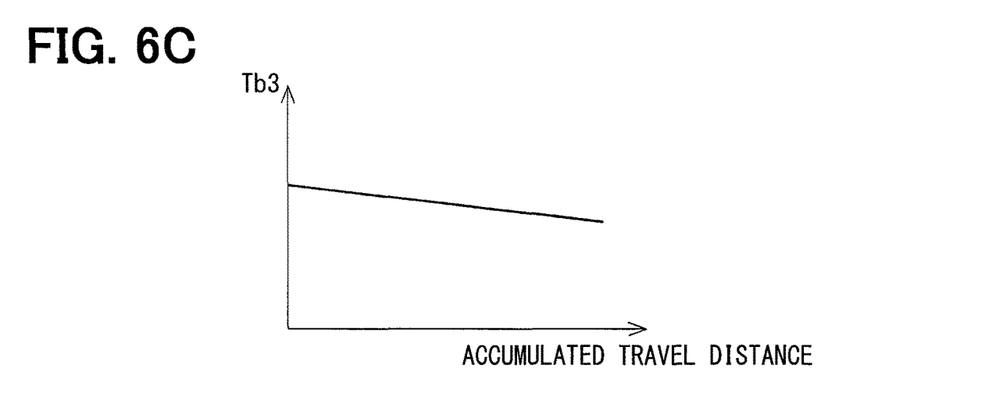

As shown in FIG. 6A, FIG. 6B and FIG. 6C, the MG control part 60 has maps, which represent provisional values Tb1, Tb2 and Tb3 of the limitation ending temperature Tb relative to the MG load, the cooling water volume and the accumulated travel distance, respectively. As shown in FIG. 6A, the provisional value Tb1 is set to decrease as the MG load increases. As shown in FIG. 6B, the provisional value Tb2 is set to increase as the flow speed of the inverter cooling water increases. As shown in FIG. 6C, the provisional value Tb3 is set to decrease as the accumulated travel distance increases. A minimum value of the provisional values Tb1, Tb2 and Tb3 is set to the limitation ending temperature Tb. The limitation ending temperature Tb is set to be lower than the limitation starting temperature Ta. That is, Tb<Ta.

Referring to FIG. 4 again, at S111 executed when the decrease check flag FlgD is in the set-state (S102: YES) or executed following S110, the torque limitation part 62 checks whether the element temperature Te is higher than the limitation ending temperature Tb. When the element temperature Te is equal to or lower than the limitation ending temperature Tb (S111: NO), the processing is shifted to S113. When the element temperature Te is higher than the limitation ending temperature Tb (S111: YES), the processing is shifted to S112.

At S112, the torque limitation part 62 maintains the torque limitation state, which is performed when the element temperature Te is at the peak temperature Tp. Specifically, the torque limitation part 62 sets the torque limitation coefficient k to the peak-time limitation coefficient kp and calculates the limited torque command value trq*_a by multiplying the torque command value trq* by the peak-time limitation coefficient kp. The peak-time limitation coefficient kp is not limited to the torque limitation coefficient k, which is determined when the element temperature Te was actually a maximum. For example, by assuming that the element temperature Te, which was calculated immediately before the decrease of the element temperature Te, to be the peak temperature Tp, the torque limitation coefficient k determined in the previous calculation may be determined to be the peak-time limitation coefficient kp. At this step, since the peak-time limitation coefficient kp is smaller than 1, the limited torque command value trq*_a is smaller than the torque command value trq* thereby limiting the torque of the MG 3. S112 is executed when the torque limitation flag FlgR=1 and the decrease check flag FlgD are both in the set-state (that is, FlgR=1 and FlgD=1).

At 113 executed when the element temperature Te is equal to or lower than the limitation ending temperature Tb (S111: NO), the torque limitation part 62 increases the torque limitation coefficient k from the peak-time limitation coefficient kp to 1 at a predetermined rate thereby to gradually decrease the torque limitation. At S114, the torque limitation part 62 checks whether the torque limitation release has been finished. When the torque limitation release has not been finished yet (S114: NO), that is, the torque limitation coefficient k is smaller than 1, this check processing is repeated. When the torque limitation release has been finished (S114: YES), the processing is shifted to S115. At S115, the torque limitation part 62 resets the torque limitation flag FlgR and the decrease check flag FlgD thereby finishing the processing described above.

Figure 7:
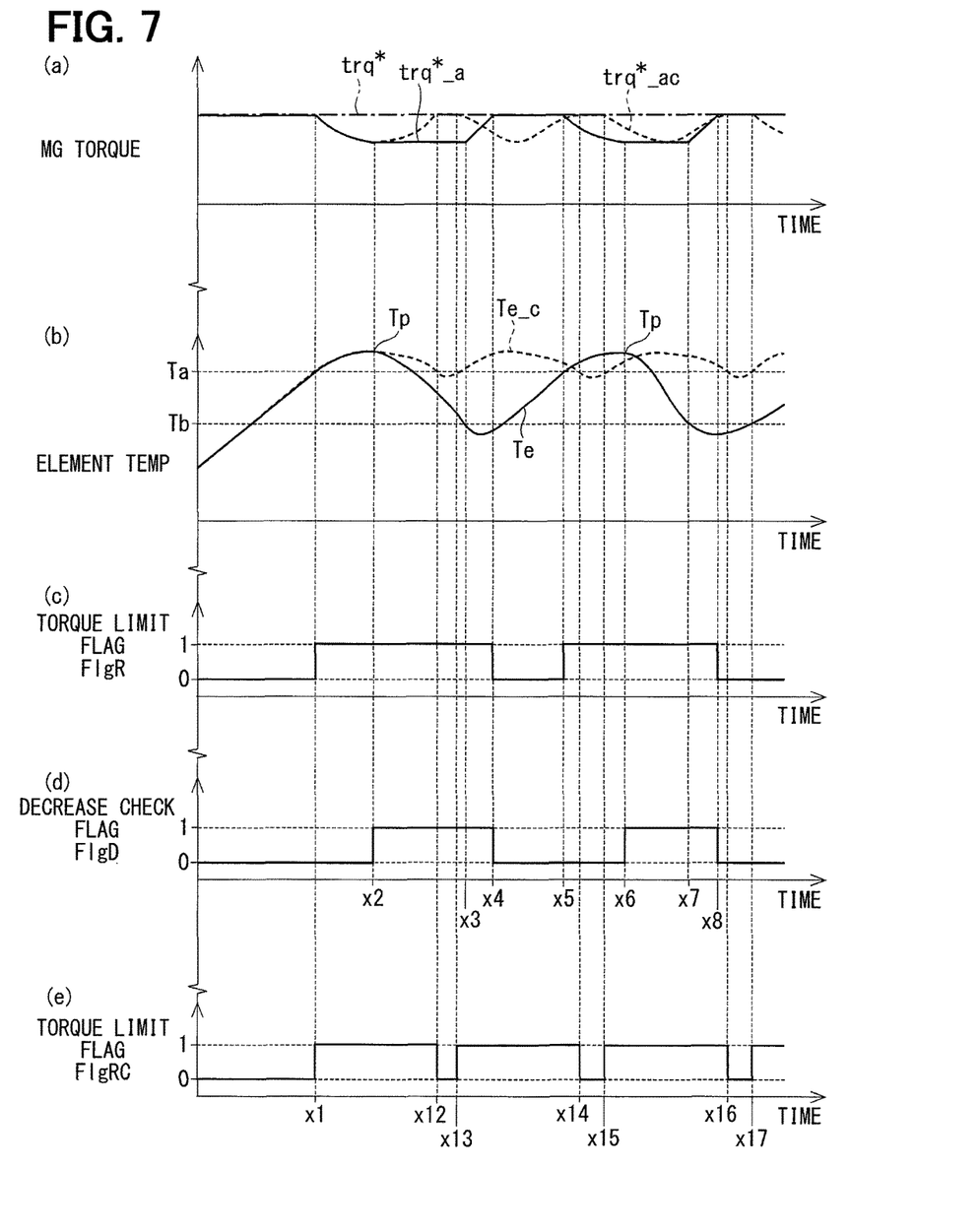
FIG. 7 is a time chart showing the torque limitation processing in the embodiment.

The torque limitation processing executed in the present embodiment will be described further with reference to a time chart shown in FIG. 7. In FIG. 7, an abscissa axis indicates time. In FIG. 7, (a) indicates the MG torque, (b) indicates the element temperature, (c) indicates the torque limitation flag FlgR and (d) indicates the decrease check flag FlgD. It is assumed as a comparative example that, similarly to a case of temperature increase, the torque limitation is performed in accordance with the element temperature Te even in a case of temperature decrease. That is, in the comparative example, even when the element temperature Te decreases, the torque limitation is performed by using the coefficient k calculated by the map indicated by the solid line in FIG. 3. The torque limitation flag FlgRC in the comparative example is shown in (e). In (a), the torque command value trq* is indicated by a one-dot chain line, the limited torque command value trq*_a in the present embodiment is indicated by a solid line and the limited torque command value trq*_ac in the comparative example is shown by a dotted line. In (b), the element temperature Te in the present embodiment is indicated by a solid line and the element temperature Te_c in the comparative example is indicated by a dotted line.

It is assumed that, as shown in (a), the torque command value trq* is constant and the MG 3 is driven with the constant torque. As shown in (a) and (b), when the element temperatures Te and Te_c increase and exceed the limitation starting temperature Ta at time x1 because of driving of the MG 3, the torque limitation flags FlgR and FlgRC are set and the torque limitation is performed in accordance with the element temperatures Te and Te_c. By the torque limitation, increases of the element temperatures Te and Te_c are suppressed and the element temperatures Te and Te_c change from increasing to decreasing at the peak temperature Tp at time x2.

When the element temperature Te_c thus starts to decrease after time x2 in the comparative example, the torque limitation coefficient k increases with a decrease in the element temperature Te_c as indicated by the solid line in FIG. 3. That is, the torque limitation is reduced as the element temperature Te_c decreases. Thus, as indicated by the dotted line in (a), the MG toque trq*_ac increases again with the decrease of the element temperature Te_c in the comparative example after time x2. As a result, in the comparative example, the limited torque command value trq*_ac approaches the torque command value trq*. Further, when the element temperature Te_c decreases to be lower than the limitation starting temperature Ta at time x12, the torque limitation is stopped. As a result, the limited torque command value trq*_ac coincides with the torque command value trq*. Further, when the element temperature Te_c changes to increase and exceeds the limitation starting temperature Ta at time x13 again, the torque limitation is performed again. Similarly to the operation described above, the torque limitation flags Flg_RC is maintained in the set state after time x13 as shown in (e) except for a period from time x14 to time x15, during which the element temperature Te_c is lower than the limitation starting temperature Ta, and a relatively short period from time x16 to time x17. In the case of the comparative example, the element temperature Te_c may occasionally change only above the limitation starting temperature Ta and the torque limitation may not be stopped. That is, in the case of the comparative example, the torque of the MG 3 changes in accordance with the temperature for a long period and the sensitivity of torque relative to temperature is high.

In the present embodiment, however, when the element temperature Te changes from increasing to decreasing at time x2 as indicated by solid lines in (a) and (b), the decrease check flag FlgD is set as shown in (d). Since the peak-time limitation coefficient kp is maintained for a period until time x3, at which time the element temperature Te decreases to be lower than the limitation ending temperature Tb, the limited torque command value trq*_a does not depend on the element temperature during such a period. That is, in the example shown in FIG. 7, since the torque command value trq* is set to be constant, the limited torque command value trq*_a is also constant and hence the torque variation of the MG 3 is suppressed.

When the element temperature Te decreases to be lower than the limitation ending temperature Tb at time x3, the torque limitation coefficient k is changed from the peak-time limitation coefficient kp to 1 gradually. In (a), the limited torque command value trq*_a is increased by increasing linearly the torque limitation coefficient k toward k=1. However, the limited torque command value trq*_a may be increased in steps in the comparative example.

It is thus possible to suppress the torque of the MG 3 from changing rapidly. When the torque limitation coefficient k reaches 1 at time x4, the limited torque command value trq*_a coincides with the torque command value trq*. At time x4, the torque limitation flag FlgR and the decrease check flag FlgD are reset. After stopping of the torque limitation, the element temperature Te increases again. When the element temperature Te reaches the limitation starting temperature Ta at time x5 again, the torque limitation is performed again. The processing executed from time x5 to x8 is similar to that executed from time x1 to time x4.

In the present embodiment, when the temperature Te increases to be higher than the limitation starting temperature Ta, the torque of the MG 3 is limited in accordance with the element temperature Te. When the torque limitation is performed as exemplified as the comparative example, that is, when the torque is limited even in the case of temperature decrease similarly to the case of temperature increase, the element temperature Te hardly decreases. As a result, the limited torque command value trq*_ac tends to vary for a long period in accordance with the element temperature Te_c and the torque of the MG 3 tends to vary. To counter this problem, when the element temperature Te changes from increasing to decreasing, the peak-time limitation coefficient kp is maintained independently of the element temperature Te until the element temperature Te decreases to the limitation ending temperature Tb. That is, when the element temperature Te decreases, the torque sensitivity relative to the element temperature Te is lowered. It is thus possible to suppress torque variation, which occurs in correspondence to the variation in the element temperature.

In the present embodiment, the limitation ending temperature Tb is set to be lower than the limitation starting temperature Ta as shown in (b). That is, the torque limitation is stopped after the element temperature Te decreases to be lower than the limitation starting temperature Ta. As a result, even when the element temperature Te increases again after the torque limitation has been stopped, the element temperature Te becomes the limitation starting temperature Ta and the period until the torque limitation is performed again is lengthened in comparison to the comparative example.

Since the torque limitation is performed less frequently, the drivability is improved particularly in a heavy load driving operation. Further, denpi (electric power cost) is reduced. Still further, the number of times of notifications of the torque limitation to the driver is reduced. In addition, the MG control part 60 includes the torque limitation part 62. As a result, response characteristic of the torque limitation is improved in comparison to a case, in which the vehicle control part 51 performs the torque limitation processing for example.

As described above, the MG control part 60 includes the temperature control part 61 and the torque limitation part 62 to control driving of the MG 3, which is the driving power source of the vehicle 90. The temperature control part 61 calculates the system temperature of the MG driving system 1, which includes the MG 3 and the driving circuit part 20 having the inverter 30 for switching over current supply to the MG 3. The element temperature Te is used as representing the system temperature.

The torque limitation part 62 limits the torque of the MG 3 when the element temperature Te representing the system temperature increases to be higher than the limitation starting temperature Ta. In the case that the element temperature Te changes from increasing to decreasing as a result of limiting the torque of the MG 3, the torque limitation part 62 continues the torque limitation, which is performed when the element temperature was the peak temperature Tp, until the limitation continuation period elapses at the limitation ending temperature Tb. When the element temperature Te changes from increasing to decreasing, the torque limitation is performed by using the torque limitation coefficient kp thereby to maintain the torque limitation, which was performed when the element temperature Te was at the peak Tp. It is thus possible to suppress overheating of the MG driving system 1 and improve the drivability because of the limited torque variation.

The torque limitation part 62 assumes that the limitation continuation period has elapsed when the element temperature Te decreased to be or lower than the limitation ending temperature Tb. It is thus possible to properly terminate the torque limitation, which has been maintained before the temperature decreased. The limitation ending temperature Tb is lower than the limitation starting temperature Ta. The torque limitation performed continuously before the temperature decrease is stopped after the element temperature Te has been decreased to the limitation ending temperature Tb, which is lower than the limitation starting temperature Ta. For this reason, even when the element temperature Te rises again, the torque of the MG 3 is not limited until the element temperature increases to the limitation starting temperature Ta. By thus setting the limitation ending temperature Tb to be lower than the limitation starting temperature Ta, the number of times of torque limitations is reduced.

When the limitation continuation period elapses after the change of the element temperature to decreasing and the torque limitation performed when the element temperature was the peak temperature Tp is finished, the torque limitation part 62 gradually varies the torque limitation coefficient k, which is used as a limitation value for the torque limitation. It is thus possible to suppress the rapid change in the torque of the MG 3.

The limitation ending temperature Tb is variable with at least one of the MG load, the cooling water volume of the inverter cooling water and the accumulated travel distance, which corresponds to the vehicle degradation state. The limitation starting temperature Ta is also variable with at least one of the MG load, the cooling water volume of the inverter cooling water and the accumulated travel distance.

By thus setting the limitation ending temperature Tb and the limitation starting temperature Ta variably, the torque is limited properly. It is also possible to set the limitation ending temperature Tb and the limitation starting temperature Ta variably so that the torque limitation is not performed as much as possible.

(Other Embodiment)

(A) System Temperature

In the present embodiment, the average value of the element temperatures of six SW elements of the inverter part is used as the system temperature. As the other embodiment, a maximum value or a representative value of the element temperature may be used as the system temperature in place of the average value of the element temperature. In the present embodiment, the temperature of the SW element is detected by the temperature sensitive diode, which is built in the SW element. As the other embodiment, the temperature sensitive diodes need not be provided in all of the SW elements. The temperature sensitive diodes may be provided only in some of the SW elements. The inverter temperature sensor 41 is not limited to the temperature-sensitive diodes, which are integrated in the SW elements, but may be any kinds of SW switching elements.

As the other embodiment, the system temperature of the rotary electric machine may be represented by temperatures of the SW elements and the capacitor, which form the booster part, in place of element temperature of six SW elements of the inverter part 6. The torque limitation may be performed by using, as the system temperature, a temperature of either one of the element and the rotary electric machine, which is closer to the upper limit temperatures set for the SW element and the rotary electric machine. The system temperature is not limited to a value, which is determined in accordance with the detection values of the temperature sensors, but may be an estimation value, which is determined in accordance with a current value, for example. In this case, structural elements for temperature detection (for example, temperature sensitive diode) may be obviated.

(B) Torque Limitation Processing

In the present embodiment, the torque is limited by setting the limited torque command value to be the product of the torque limitation coefficient k and the torque command value trq* and controlling the rotary electric machine based on the limited torque command value k×trq*. As the other embodiment, in a case of controlling a rotary electric machine by feedback control, the torque of the rotary electric machine may be limited by limiting a feedback gain. The rotary electric machine may be controlled in any one of methods, which are current feedback control, torque feedback control, feed-forward control and the like.

In the present embodiment, the limitation ending temperature Tb is variable with the MG load, which indicates the driving state of the rotary electric machine, the cooling water volume of the inverter cooling water, which indicates the cooling ability of the driving system for the rotary electric machine, and the accumulated travel distance, which indicates the degradation state of the driving system for the rotary electric machine. In the present embodiment, the limitation ending temperatures are calculated as provisional values in relation to the driving state of the rotary electric machine, the cooling ability of the rotary electric machine driving system and the degradation state of the rotary electric machine driving system, respectively, and the minimum value of the calculated provisional values, that is, the lowest temperature, is set as the limitation ending temperature. As the other embodiment, the limitation ending temperature may be set to the maximum value of the provisional values, that is, the highest temperature, or the average value of the provisional values, that is, average temperature, as a replacement for the minimum value of the provisional values. As the other embodiment, without calculating the provisional values, the limitation ending temperature Tb may be set directly from a multi-dimensional map or the like based on the driving state of the rotary electric machine, the cooling ability of the rotary electric machine driving system and the degradation state of the rotary electric machine driving system.

As the other embodiment, as a parameter for changing the limitation ending temperature, a part of the driving state of the rotary electric machine, the cooling ability of the rotary electric machine driving system and the degradation state of the rotary electric machine driving system may be excluded. Further, as the driving state of the rotary electric machine other than the MG load, other parameters indicating the driving state of the rotary electric machine may be used. Further, as the cooling ability of the rotary electric machine other than the cooling water volume, other parameters such as a temperature of the cooling water may be used. Further, as the degradation state of the rotary electric machine driving system other than the accumulated travel distance, other parameters indicating the degradation state of the rotary electric machine driving system may be used. As the other embodiment, the limitation ending temperature may be a fixed temperature. Similarly, the limitation starting temperature may be a fixed temperature.

In the present embodiment, the limitation starting temperature Ta is set from the provisional values, which correspond to the driving state of the rotary electric machine, the cooling ability of the rotary electric machine driving system and the degradation state of the rotary electric machine driving system. As the other embodiment, each provisional value may be regarded as the limitation starting temperature. The torque limitation coefficient may be calculated to be used for calculation of the limited torque command value, by calculating a provisional value of the torque limitation coefficient with respect to each regarded provisional value and multiplying by the provisional value of the torque limitation coefficient.

In the present embodiment, the limitation ending temperature Tb is lower than the limitation starting temperature. As the other embodiment, the limitation ending temperature Tb may be equal to or higher than the limitation starting temperature. In the present embodiment, when the system temperature decreases to be lower than the limitation ending temperature, the torque limitation is released gradually by assuming that the torque limitation period has elapsed. For example, when the peak-time limitation coefficient kp is relatively close to 1, the torque-limited state may be stopped quickly by directly returning the torque limitation coefficient to 1 after the elapse of the limitation continuation period. Further, by setting the limitation continuation period to a predetermined period independently of the system temperature, the torque limitation may be released after continuing for the predetermined period the torque limitation state performed at the peak time of the system temperature.

(C) Rotary Electric Machine Control Apparatus

In the present embodiment, the MG control part 60 forms the rotary electric machine control apparatus. As the other embodiment, a part or all processing executed by the rotary electric machine control apparatus may be executed by other than the MG control circuit part. In this case, a control part, which executes the processing of the temperature calculation part and the torque limitation part, operates as the rotary electric machine control apparatus. The control circuit part, which operates as the rotary electric machine control apparatus, may be formed of plural control units.

(D) Driving Circuit Part

In the present embodiment, the SW element is the IGBT and provided to radiate heat from both element surfaces. As the other embodiment, the SW element may be other element such as a MOSFET. The heat radiation structure of the SW element is not limited to heat radiation from both of side surfaces but may be from only one side surface. In the present embodiment, the circuit part includes the boost converter 21. As the other embodiment, the boost converter need not be provided. Further, the relay 16 need not be provided between the power supply source and the circuit part.

(E) Rotary Electric Machine

In the present embodiment, the rotary electric machine is the permanent-magnet type synchronous three-phase AC rotary electric machine. As the other embodiment, the rotary electric machine may be other than the permanent-magnet type synchronous three-phase AC rotary electric machine.

(F) Vehicle

In the present embodiment, the vehicle is a front-wheel drive vehicle. As the other embodiment, the vehicle may be a rear-wheel drive vehicle or an all-wheel drive vehicle. In the present embodiment, is a single motor electric vehicle, which has only one rotary electric machine as a drive power source of a vehicle. As the other embodiment, the vehicle may include plural rotary electric machines as the drive power source. Further, the vehicle may be a fuel-cell vehicle or a hybrid vehicle, which is provided with an engine in addition to the rotary electric machine as the drive power source of the vehicle.

What is claimed is:

1. A rotary electric machine control apparatus for controlling driving of a rotary electric machine, which is a drive power source of a vehicle, the rotary electric machine control apparatus comprising:
    a temperature calculation part for calculating a system temperature of a rotary electric machine driving system in response to a temperature of an inverter part or a temperature of a booster part sensed by a temperature sensor; and
    a torque limitation part for limiting a torque of the rotary electric machine, when the system temperature increases to be higher than a limitation starting temperature,
    wherein the torque limitation part continues a torque limitation performed at a peak temperature of the system temperature until a limitation continuation period elapses, the peak temperature indicating a change of the system temperature from increasing to decreasing as a result of limiting the torque of the rotary electric machine,
    wherein the rotary electric machine driving system includes the rotary electric machine and a driving circuit part, and
    wherein the driving circuit part includes the inverter part for switching over current supply to the rotary electric machine and/or the booster part for boosting DC power of an output voltage.

2. The rotary electric machine control apparatus according to claim 1, wherein:
    the torque limitation part assumes that the limitation continuation period has elapsed when the system temperature decreases to be lower than a limitation ending temperature.

3. The rotary electric machine control apparatus according to claim 2, wherein:
    the limitation ending temperature is set to be lower than the limitation starting temperature.

4. The rotary electric machine control apparatus according to claim 2, wherein:
    the limitation ending temperature is set variably in accordance with at least one of a driving state of the rotary electric machine, a cooling ability of the rotary electric machine driving system and a degradation state of the rotary electric machine driving system.

5. The rotary electric machine control apparatus according to claim 1, wherein:
    the torque limitation part gradually decreases a limitation value for the torque limitation, when the limitation continuation period elapses after the system temperature has changed to decreasing at the peak temperature.

6. The rotary electric machine control apparatus according to claim 1, wherein:
    the limitation starting temperature is set variably in accordance with at least one of a driving state of the rotary electric machine, a cooling ability of the rotary electric machine driving system and a degradation state of the rotary electric machine driving system.

7. The rotary electric machine control apparatus according to claim 1, wherein:
    the torque limitation part includes a change detection part for detecting the change of the system temperature from increasing to decreasing after starting torque limitation at the limitation starting temperature.

8. The rotary electric machine control apparatus according to claim 1, wherein:
    the torque limitation part limits the torque of the rotary electric machine by using a torque limitation value, which is set to decrease with an increase in the system temperature; and
    the torque limitation part continues to use same torque limitation value, which is set at the peak temperature, until the limitation continuation period elapses irrespective of a decrease in the system temperature.

* * * * *